May 1, 1945.   C. E. LAUE   2,374,690
VALVE
Filed Feb. 9, 1942   2 Sheets-Sheet 1

INVENTOR.
Charles E. Laue
BY Mann, Brown & Cole
ATTYS

May 1, 1945.　　　C. E. LAUE　　　2,374,690
VALVE
Filed Feb. 9, 1942　　2 Sheets-Sheet 2
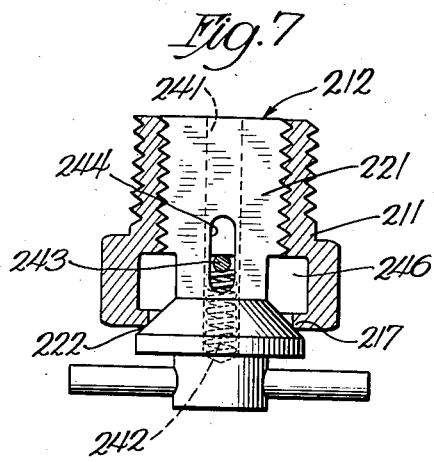
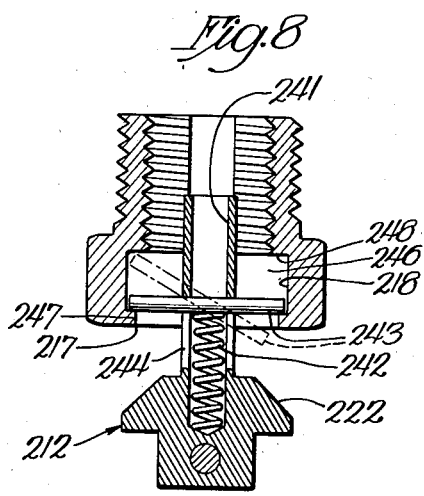
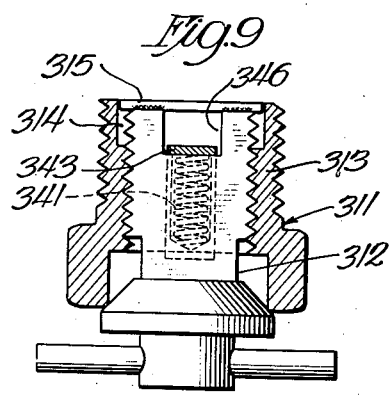
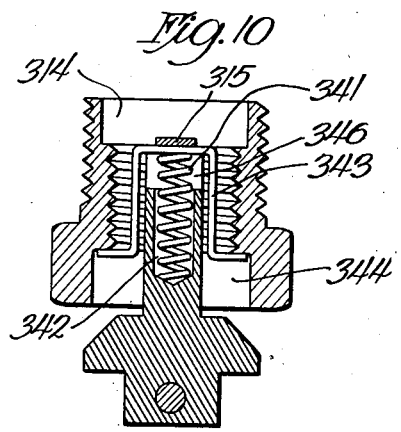
INVENTOR.
Charles E. Laue
BY Mann, Brown & Cox
ATTYS Patented May 1, 1945

2,374,690

UNITED STATES PATENT OFFICE 2,374,690

VALVE

Charles E. Laue, Chicago, Ill.

Application February 9, 1942, Serial No. 430,092

19 Claims. (Cl. 137—34)

This invention relates to valves, particularly to those suitable for drain valves such as are used for draining vehicle radiators, tanks, and the like. Although there have been a wide variety of drain valves in the past, such valves have been subject to numerous faults, some of which have long been recognized and others of which have perhaps never been recognized heretofore. The present invention in its preferred form overcomes all of these faults. A number of the improvements embodied in the preferred form of the invention are enumerated below. It should be recognized that, although these features cooperate to produce certain advantages, many of them may be used independently with advantage over present valves.

Quick opening and closing

It is hard to state which of the novel features is most important. One of the more important is that, while the valve is of the screw or threaded type in which a relatively small manual force will produce very high seating pressures of the valve plug on the valve seat, it is nevertheless a quick opening and closing valve. This is accomplished by providing threads on the plug only on, say, two sides thereof and providing slots in the correspondingly threaded sleeve, so disposed that after the plug has been unscrewed for only about a sixth of a revolution its threaded portion will coincide with the slots so that it may be moved longitudinally away from the seat and immediately open the valve to its full capacity.

If it is not desired to open the valve to its full capacity, it may be held seated while it is turned through the drop-away position, after which it may be unscrewed gradually to control the flow through the valve.

The plug and slots are preferably non-symmetrical so that the plug will have only a single drop-away position. This has at least two advantages: First, after being turned through the drop-away position, it may be unscrewed gradually for nearly a complete revolution before it again comes to the drop-away position, thus giving a wide range of flow control when it is desired to control the flow. The second advantage of the non-symmetrical feature is that this makes it possible to so dispose the threads on the plug with respect to the seating position of the plug as to control the amount the plug will turn before seating when the plug has been fully released and is pushed in through the slots to the seating position. The relationship may provide for very quick seating or for another feature discussed below under "Safety release."

Numerous advantages of a quick opening valve will be apparent. One is merely the matter of convenience. Another is the possible desirability of quick destruction of war craft or war equipment by quickly opening a drain valve of a fuel tank when it is about to be captured, and igniting the fuel.

Rapid flow

For any given size of outer diameter the valve has an exceptionally rapid flow. This results mainly from the two features—the positioning of the seat at the bottom of the plug where space is limitless so that it may be opened as widely as desired, and the cutting away or omission of the major cross section of the shank so that there is adequate flow area through the threaded portion of the valve. It will be observed that this cutting away of the shank accomplishes at the same time the omission of the threaded portions necessary to provide the quick opening and release feature of the valve.

Flushing action

Closely related to the high rate of flow is a flushing action produced thereby which tends to wash clean the surface of the plug which closes on the seat. This is probably produced not only by the rate of flow but by virtue of the fact that there is little or no obstruction to the flow below the surface in question, and hence whatever flow there is sweeps at its fastest speed across this surface.

Fail-safe

If enough force is applied to any valve, something has got to yield. In commercial valves heretofore if a mechanic applied a wrench or pliers to tighten the plug and exerted too much force he would crumble the plug in the vicinity of the seating surface thereof so that this surface itself was distorted and caused a leak. This was apparently partly due to the provision of holes in the plug between the handle portion and the sealing surface. According to the present invention there are no holes between the sealing surface and the handle, and in fact the sealing surface is at the top of a solid block forming the handle so that it will be unaffected by any failure due to turning the handle with too much force. As a matter of fact, the absence of any weakening holes and the provision of the sealing surface between the handle and the threads enables the plug to withstand much more force than prior plugs without danger, and, as previously noted, the damage when it does occur will not produce a leak. This is obviously a very important feature of safety in war craft, where leaks would be highly dangerous and where the best of intentions are especially likely to lead mechanics to tighten valves too firmly.

Easy seating and reseating

In the preferred form of the valve with the quick-opening slots, a sealing engagement between the plug and the seat may be formed with the utmost ease by turning the plug to the position in which the threads are disengaged and tapping it with a hammer. Thus, if in service something should happen to the seat so that it is imperfect and a leak appears, it can ordinarily be remedied by reseating as described. If preferred, however, it can also be remedied by removing the plug and filing the bottom surface of the remaining sleeve with a flat file. Since the seal is not on this surface but merely on the internal edge thereof, it is not essential for the filing to be extremely accurate. Of course, because of the accessibility of this surface, an extremely accurate job can easily be performed on a lathe or with other machine tools if desired.

Non-dropable plug with ease of disassembly

The valve lends itself very easily to the provision of means for preventing the plug from dropping entirely out of the body. For example, a pin can be inserted through the shank extending in and beyond the valve body so that after the plug has been moved to the open position it cannot be moved farther. In spite of this pin, the valve may nevertheless easily be disassembled merely by removing the pin.

Accessible seat

Both the seat of the body and the seat or cone of the plug are highly accessible. Being positioned at the bottom of the body, they can easily be wiped off if occasion should arise. The ease of filing the bottom of the body to renew the seat thereon has already been mentioned. Positioning the seats at the bottom of the body instead of inside thereof also contributes to providing a strong valve and to providing a valve of smaller size for any given flow that may be desired.

Self-centering

In the preferred form of valve where portions of the threads of the plug are omitted, the valve has a self-centering action resulting from the fact that it engages the threads only at generally diagonally opposite points so that it can shift within the threads and tilt about a line passing through these points if for any reason the seat should not be perfectly alined with and perpendicular to the axis of the threads in the body.

Safety release

If desired, the slots may be so positioned that, after the valve has been closed by ordinary pressure, further tightening thereof by a tool will turn it to a drop-down or release position prior to stripping the threads or causing other damage. This renders the valve substantially foolproof: If it is closed with ordinary pressure, it will seal in the usual way; if it is closed further by a tool, it will be further tightened until it approximately reaches the point of failure, at which time it will be suddenly released instead of being damaged. It may then be reclosed immediately.

Additional objects and advantages will be apparent from the following description and from the drawings, in which:

Figs. 7 and 8 are vertical cross sectional views showing a third form of the invention.

Figs. 9 and 10 are corresponding cross sectional views of a fourth form of the invention.

Figure 1:
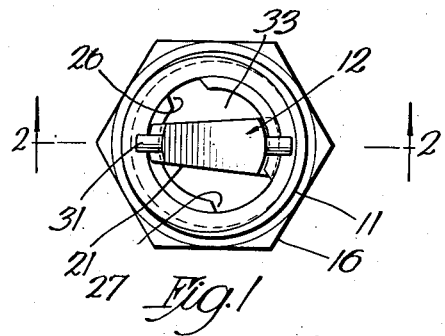
Fig. 1 is a plan view of one of the preferred forms of the valve chosen for illustration of this invention.

Four forms of the invention have been chosen for illustration and description, in compliance with section 4888 of the Revised Statutes, but persons skilled in the art will readily perceive other means for accomplishing the same results, and the claims are therefore to be construed as broadly as possible, consistent with the prior art.

For most purposes the form of the invention shown in Figs. 1 to 5 will probably be preferred. In this form the valve includes a body 11 and a plug 12. The body 11 includes a sleeve portion 13 threaded internally to receive the plug 12 and externally to screw into an outlet boss 14. This boss may be formed as part of a fuel tank, radiator, or any other container for which a valve of this type may be desired. A head 16 formed at the outer end of the body 11 is preferably hexagonal externally so that it may be screwed in with a wrench and is provided with a circular seat 17 formed at the meeting edge between an internal cylindrical wall 18 and a bottom surface 19.

The plug 12 includes a shank 21 which is threaded to cooperate with the sleeve 13, a preferably conical seat portion 22 which seals against the seat 17, and a handle 23. In the illustrated form the handle 23 comprises a pin extending through a stud 24 formed integrally with the cone 22, but of course any other handle or head could be provided. The seat may, of course, be flat to engage the surface 19 in order to seal the valve.

Figure 3:
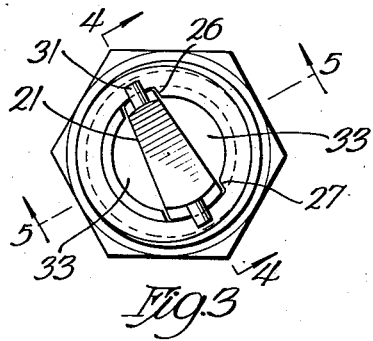
Fig. 3 is a plan view of the structure shown in Fig. 1 but with the plug turned to a quick-release position.
Figure 2:
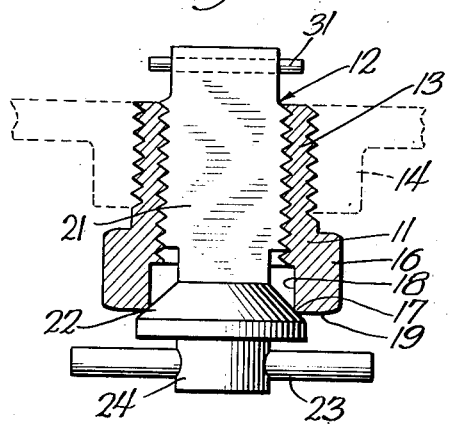
Fig. 2 is a vertical sectional view taken approximately on the line 2—2 of Fig. 1.
Figure 4:
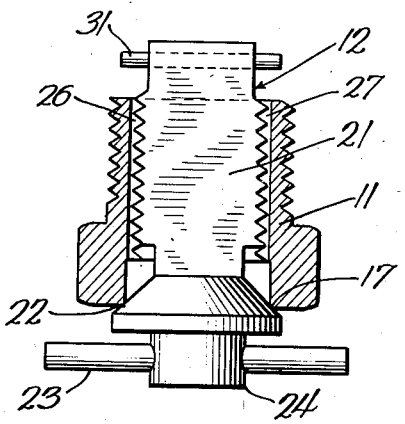
Fig. 4 is a sectional view taken approximately on the line 4—4 of Fig. 3, showing the plug as if pushed up into seating position ready to be tightened by screwing action.

As seen best in Fig. 3, the sleeve 13 is slotted at 26 and 27. These slots may be formed by routing out the threads. The shank 21 is so shaped that in one position its threads will lie entirely within these slots 26 and 27. In this position of shank 21 it will be possible to move the plug 12 up and down in the body 11 without turning it, this action being most clear from Figs. 4 and 5.

It will be observed from Fig. 3 that the slot 27 is wider than the slot 26 and that the shank 21 is so shaped that it will fit into these slots in only one position. This makes possible a predetermined positioning of the threads with respect to the position of the plug when it is thrust upwardly or inwardly against the seat as shown in full lines in Fig. 4. Under some conditions the positioning which will be preferred is that which will aline the threads on the shank 21 with the leading edges of the adjacent threads when the plug has been shoved to its inner position closely enough so that the respective threads will enter one another without appreciable obstruction. It will be readily understood that if the threads on the plug were positioned on the shank slightly lower than they are, say half the distance of the pitch, the ends of the threads on the shank would strike the ends of the threads adjacent the slots, so that the plug in this position could not be turned and the user would have to drop the plug slightly in order to get the threads to mate. However, it is not necessary that the threads of one part be perfectly alined midway between the threads of the other, and in fact it is preferred that the threads of the plug be slightly higher than this position so that in turning the plug it will initially be positioned minutely off the seat. The only advantage of this is that it will let the plug turn about one-sixth of a turn before the threads tighten the cone 22 on the seat 17. This position is seen in Fig. 1, and it will be seen that it is only with this one-sixth turn that the threads on the shank are entirely within the threads of the sleeve, thus utilizing the full strength of the threads.

For some purposes it may be desirable to so proportion the parts that the plug will turn approximately three-fifths or two-thirds of a revolution after it has been shoved inwardly in the slots to the limit of its inward movement. This will have the advantage that upon turning the plug for one-third of a revolution further, it will complete its revolution so that its threads will again be entirely within the slots, thus permitting it to drop down. This provides the safety release feature discussed in the introduction to the specification. In other words, if a mechanic, by applying too much force with pliers or a wrench to the plug, turns it to a position where some part is likely to fail; it will, before reaching the failing point, release by virtue of having the threads come within the slots. It will then merely be necessary to push it in and turn it again, being careful not to turn it quite so far in this instance. Of course, the seat may be deformed enough so that the plug would turn further than it would have turned originally, but it will still seal nevertheless. One example of a thread pitch that has been found satisfactory is 24 threads per inch, with a brass valve of the proportions shown, the inside diameter of the body being ½ inch. If desired, the threads may be relieved a little adjacent their separating ends to decrease the pressure and prevent injury to the threads.

It should be observed that with the form of valve now preferred the slots and plug are each angularly non-symmetrical so that they have only one position for longitudinal movement of the plug. This is not necessary. By making them symmetrical they could have two positions, or with three slots and three threaded portions of the plug they could have three positions of longitudinal movement. Of course, they could have more such positions but probably more would never be desired. A symmetrical shape with two slots would have an advantage in that in initial assembly of the plug it could be installed in the proper manner so that approximately one-sixth of the turn of the plug after it was pushed in would cause seating of the valve, and then another third of a turn would turn the plug to the safety-release position. It is true that in this second position of longitudinal movement the threads would not mate properly when the plug was at its inner position, but upon dropping the plug down to thread-mating position the plug would turn 180° to return it to the proper starting position.

It will be observed that in the form of the valve shown in Figs. 1 to 5, a retaining pin 31 is provided extending through the shank and adapted to come to rest on the inner edge of the sleeve 13. It is probably most desirable to have this pin so positioned that when the plug is in its outer position the threads do not mate but block turning of the plug so that anyone who tries to turn the plug in this position instead of shoving it in, will be reminded to shove the plug in first. In case of the symmetrical construction, the turning of the plug should be blocked when the plug is in the correct position but not when it has been turned 180° to the wrong position. With this arrangement a user who instinctively tries to turn the plug before pushing it in will not be able to turn it away when it is in the right position but will always be able to turn it to the right position if it is not already in the right position.

It will be observed from Fig. 3 that all of the zone 33 on each side of the shank 21 is available for the flow of a liquid through the plug. The available cross section between the seat 17 and the cone 22 is determined entirely by the distance to which the pin 31 will allow the plug to drop. A moderate drop will give a cross section at this point equal to the cross section available on the two sides of the shank 21. The resulting flow is very much greater than has been possible heretofore with any valve of the same diameter, except by completing the movement of the plug. Of course, with gaseous valves including steam valves, neither a wide flow area nor the quick-opening action is ordinarily necessary. In the preferred form of the invention with the quick-release feature the slots should not be so deep as to let the plug cant or tilt to one side so far that the threads will not mate easily.

Figure 6:
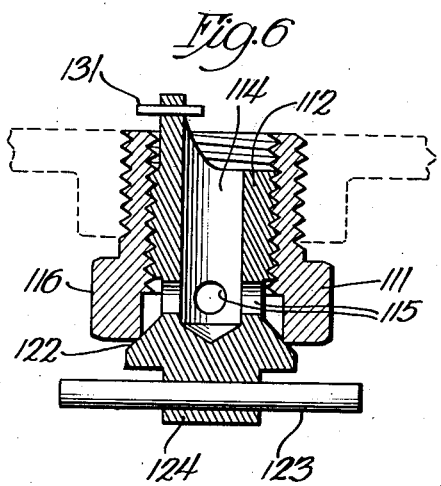
Fig. 6 is a vertical sectional view of a modified form of the invention.
Figure 5:
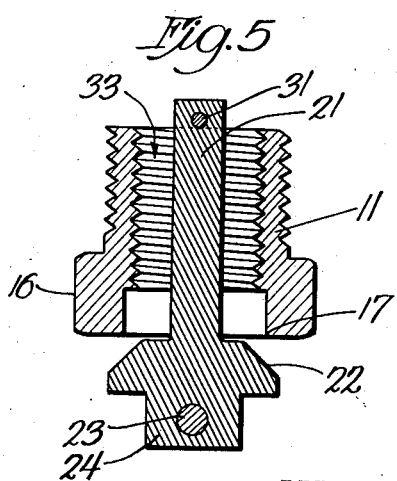
Fig. 5 is a view taken on the line 5—5 of Fig. 3, showing the valve open.

Another construction which may be used when the quick release is not desired is shown in Fig. 6. In this form of valve the sleeve 111 is not slotted and the plug 112 is cylindrical. The plug is provided with an inwardly opening bore 114 and transverse bores 115 therethrough, the bores 115 opening immediately above the cone 122. The head 116 should, as illustrated, form a skirt extending low enough so that when the bores 115 are entirely open the liquid flowing therethrough will strike the skirt and be deflected downwardly instead of shooting out in an independent stream.

It will be observed that in this form of the valve the cone 122 and stud 124 are integrally constructed and are solid between the handle 123 and the cone 122. This sturdy type of construction substantially eliminates the danger of so distorting the seat portion or cone 122 by excess force applied to the handle 123 as to cause a leak.

In this form of the valve there will not be as much need for the retaining pin 131 since this form of valve would ordinarily not be unscrewed far enough to drop out. However, a retaining pin 131 may be provided if desired. If not, the plug 112 would not project above the body 111.

Figs. 7 to 10 show two other forms of quick-opening valves. These valves are substantially the same as that of Figs. 1 to 5 except for a provision of a different retaining means and the provision of a spring for opening the valve quickly should it not be in a position to be opened by gravity.

In the form shown in Figs. 7 and 8 the body 211 cooperates with a plug 212, the shank 221 of which is provided with a central longitudinal bore 241 into which a spring 242 may be dropped. A pin 243 is then inserted through slots 244 and bore 241 to hold the spring in and hold it under compression. By tilting the pin 243 as seen in dotted lines in Fig. 8, it may be slipped through the seat 217 into position in the annular chamber 246 in the body. The length of the pin 243 should be slightly in excess of the distance from the wall 218 to the corner 247, so as to prevent the pin 243 or the plug from being removed except by the reverse of the procedure in which they were inserted.

As the plug is thrust inwardly, the pin 243 will bear against the shoulder 248, whereupon the spring 242 will be further compressed as the plug is pushed further in. The result is that, after the plug has been screwed to a tightened position, if it is unscrewed to the quick-release position, as seen in Fig. 3, the spring will press the plug outwardly to open the valve even though it may be in a position where it has to work against the force of gravity.

From Fig. 8 it will be observed that the plug 212 will drop considerably further than in Figs. 1 to 5 so that the space between cone 222 and seat 217 is considerably greater than in the other figures. This may increase the rate of flow slightly but there is believed to be adequate flow in the form shown in the other figures. The chief advantage of the increased drop shown in Fig. 8 is therefore that the liquid will flow nearly straight down and will tend to flow smoothly around the cone 222 rather than striking the cone with such force and speed as to be thrown out somewhat radially.

Another form of spring-actuated valve is shown in Figs. 9 and 10. At the inner end of the body 311 or sleeve 313 an annular recess 314 is provided. A retaining pin 315 is secured to the end of the plug 312 in any suitable manner as by soldering or brazing. The plug 312 is preferably of such length that the pin 315 will not project inwardly of the sleeve 313 at any time, this being desirable in instances in which the internal clearance might be small. When the plug is shifted to its outer position, its movement is limited by engagement of the pin 315 with the bottom of the recess 314.

In this form of the invention a spring 341 is provided for pressing the plug toward the open position. This spring is compressed within a bore 342 of the valve and reacts against a stirrup 343, as clearly seen in Fig. 10. This figure also clearly shows the manner in which the stirrup is supported at the base of the recess 344. Movement of the plug with respect to the stirrup is permitted by a slot 346 extending through the shank at the inner end thereof.

It will be observed that in all of the illustrated forms of the invention the seat formed by the body is at the very bottom of the body where it is most easily accessible. In fact, it is entirely possible to renew the seat merely by using a flat file to file off the bottom surface of the body. This of course would not be practicable if the plug was to seal against the surface as a whole, but, since it merely seals against the inner edge of the surface, very good results can be obtained in this manner. Of course, this seat is also accessible for easily renewing on machine tools. Another way that the seat can be renewed or initially formed in all of the structures, except in Fig. 6, is to turn the plug to the position in which it is free for longitudinal movement and strike it with a hammer. Because of the fact that the threads do not prevent longitudinal movement of the plug, the entire force of the blow will be exerted on the seat, thus deforming it sufficiently to overcome minor imperfections therein. If the body is made of brass and the plug of a harder noncorrosive metal such as a stainless steel, any damage from foreign matter in the use of the valve will be confined to the seat on the body which may be easily renewed in any of the ways stated. The seat can be renewed many times, if necessary, since there is plenty of metal available.

It will be observed that in both forms of the valve shown in Figs. 7 to 10 the plug is retained in the body without the necessity of any parts projecting inwardly of the body. In Fig. 7 the plug is shown projecting slightly beyond the body, but even this is not necessary.

In all of the illustrated forms of the invention the body of the valve was formed by a sleeve adapted to be screwed into the equipment with which the valve is to be used. It should be recognized, of course, that the body could be formed by the wall of the equipment or by a boss formed on the wall. Thus, for use in a crank case, any of the plugs shown herein could be screwed directly into the crank case if a boss were properly formed on the crank case to receive the particular plugs here shown. It is probably more likely that in a crank case the invention would be less fully utilized by omitting some of the features here illustrated. For example, if a plug having a shank of approximately the shape of that shown in Figs. 1 and 3 were used in a crank case, it would have the advantage that as soon as the plug were loosened somewhat the oil would start to flow out.

For the drain valve in the crank case it would be more desirable to have the slots broached in the body (case) as seen in Figs. 1 and 3 and the plug shank correspondingly shaped so as to get the quick-opening effect. Of course, a pin such as the pin 31 could be used even with such structures in which there is no separate body 11, although it would be necessary to get inside of the case to remove the pin.

From the foregoing it is seen that an extremely compact, simple and easily operated valve has been provided—one which in the preferred forms permits an exceptionally high rate of flow, is quick acting, is so rugged that there is little chance of a leak being caused by excessive tightening, and can be provided with a safety release which will positively prevent any damage from excessive tightening. The quick opening and closing of the valve while retaining the screw type of tightening thereof is one of its outstanding features.

I claim:

1. A valve including a body having a threaded passage therethrough, slots opening into said passage and extending longitudinally thereof, and a seat at the outer end of said passage; and a plug having a non-cylindrical shank threaded on its larger-diameter surfaces to cooperate with the threads of the body, and a seat portion for cooperating with said seat, said threads being adapted to lie entirely in the slots in one angular position of the plug whereby said plug may be moved axially when in said angular position, said slots and the corresponding threads of the plug each being non-symmetrical angularly whereby axial movement of the plug is possible with only said one angular position thereof, and the relationship between the threads and the seat portion on the plug being such that when the plug is moved axially to engage the seat portion against the seat the threads are in the right position to engage the threads of the body upon simple turning of the plug.

2. A valve including a body having a threaded passage therethrough, slots opening into said passage and extending longitudinally thereof, and a seat at the outer end of said passage; and a plug having a non-cylindrical shank threaded on its larger-diameter surfaces to cooperate with the threads of the body, and a seat portion for cooperating with said seat, said shank threads being adapted to lie entirely in the slots under certain conditions whereby said plug may be moved axially independently of said threads, the relationship between the threads and the seat portion on the plug being such that when the plug is moved axially to engage the seat portion against the seat the threads are in the right position to engage the threads of the body upon simple turning of the plug, a readily removable rod carried by said plug and interlocked with said body, and resilient means bearing against said rod and a portion of said plug.

3. A valve including a body having a threaded passage therethrough, slots opening into said passage and extending longitudinally thereof, and a seat at the outer end of said passage; and a plug having a non-cylindrical shank threaded on its larger-diameter surfaces to cooperate with the threads of the body, and a seat portion constructed and arranged for line bearing with said seat, said shank threads being adapted to lie entirely in the slots under certain conditions whereby said plug may be moved axially independently of said threads.

4. A valve including a body having a threaded passage therethrough, slots opening into said passage and extending longitudinally thereof, and a seat at the outer end of said passage, and a plug having a non-cylindrical shank threaded on its larger-diameter surfaces to cooperate with the threads of the body, and a seat portion for cooperating with said seat, said threads being adapted to lie entirely in the slots in one angular position of the plug whereby said plug may be moved axially when in said angular position, said slots and the corresponding threads of the plug each being non-symmetrical angularly whereby axial movement of the plug is possible with only said one angular position thereof, and the relationship between the threads and the seat portion on the plug being such that when the plug is moved axially to engage the seat portion against the seat the threads are in the right position to engage the threads of the body upon simple turning of the plug, and readily removable means carried by the shank and engaging an inwardly facing portion of the body for limiting the axial movement of the plug outwardly of the body.

5. A valve including a body having a threaded passage therethrough, slots opening into said passage and extending longitudinally thereof, and a seat at the outer end of said passage, and a plug having a non-cylindrical shank threaded on its larger-diameter surfaces to cooperate with the threads of the body, and a seat portion for cooperating with said seat, said threads being adapted to lie entirely in the slots in one angular position of the plug whereby said plug may be moved axially when in said angular position, said slots and the corresponding threads of the plug each being non-symmetrical angularly whereby axial movement of the plug is possible with only said one angular position thereof, and the relationship between the threads and the seat portion on the plug being such that when the plug is moved axially to engage the seat portion against the seat the threads are in the right position to engage the threads of the body upon simple turning of the plug, and means carried by the shank and engaging an inwardly facing portion of the body for limiting the axial movement of the plug outwardly of the body.

6. A valve including a body having a threaded passage therethrough, slots opening into said passage and extending longitudinally thereof, and a seat at the outer end of said passage, and a plug having a non-cylindrical shank threaded on its larger-diameter surfaces to cooperate with the threads of the body, and a seat portion formed and arranged for line bearing with said seat, said shank threads being adapted to lie entirely in the slots under certain conditions, and the relationship between the threads and the seat portion on the plug being such that when the plug is moved axially to engage the seat portion against the seat the threads are in the right position to engage the threads of the body upon simple turning of the plug, and means carried by the shank and engaging an inwardly facing portion of the body for limiting the axial movement of the plug outwardly of the body.

7. A quick-opening valve including a valve body and a plug, the valve body being threaded but having slots cut through the threads, and the plug having threaded portions adapted to engage the threads of the threaded body or to slip through the slots, a substantial cross-section of the plug being omitted to permit rapid flow of liquid through the valve, said slots and the corresponding threaded portions of said plug each being angularly nonsymmetrical.

8. In a drain valve, a member having a threaded flow passage and a seat at the outer end thereof, slots through said threads and extending longitudinally of said passage, a plug having a non-cylindrical shank, the larger-diameter surfaces of which are threaded, the threads on said shank being adapted to engage the threads in said passage or to slip through said slots, a seat on said shank formed and arranged for line bearing with the first-mentioned seat to close said passage, and means on the outer end of said shank for actuating the same, said means including a suitable surface which may be tapped with a hammer to reseat the valve when the threads on said shank are within said slots.

9. In a drain valve, a member having a threaded flow passage and a seat at one end thereof, slots through said threads extending longitudinally of said passage, a plug having a non-cylindrical shank, the larger-diameter surfaces of which are threaded, the threads on said shank being adapted to engage the threads in said passage or to slip through said slots, a seat on said plug formed and arranged for line bearing with the first-mentioned seat to close said passage, and means on said shank for actuating the same, said means including a suitable surface which may be tapped with a hammer to reseat the valve when the threads on said shank are within said slots.

10. A quick-opening valve including a valve body and a plug, the valve body being threaded but having slots cut through the threads, and the plug having threaded portions adapted to engage the threads of the threaded body or to slip through the slots, a spring adapted to urge the plug to an open position, and means for limiting the movement of the plug to prevent its removal.

11. A valve including a body having a threaded passage therethrough, slots opening into said passage and extending longitudinally thereof, and a seat at the outer end of said passage; and a plug having a non-cylindrical shank threaded on its larger-diameter surfaces to cooperate with the threads of the body, and a seat portion for cooperating with said seat, said shank threads being adapted to lie entirely in the slots in one angular position of the plug whereby said plug may be moved axially when in said angular position, said slots and the corresponding threads of the plug each being non-symmetrical angularly whereby axial movement of the plug is possible with only said one angular position thereof, and the relationship between the threads and the seat portion on the plug being such that when the plug is moved axially to engage the seat portion against the seat the threads are in the right position to engage the threads of the body upon simple turning of the plug, and a readily removeable pin carried by said shank adjacent the inner end thereof, said pin being engageable with said body to limit outward movement of said shank.

12. A valve including a body having a threaded passage therethrough, slots opening into said passage and extending longitudinally thereof, and a seat at the outer end of said passage; and a plug having a non-cylindrical shank threaded on its larger-diameter surfaces to cooperate with the threads of the body, and a seat portion for cooperating with said seat, said shank threads being adapted to lie entirely in the slots in one angular position of the plug whereby said plug may be moved axially when in said angular position, said slots and the corresponding threads of the plug each being non-symmetrical angularly whereby axial movement of the plug is possible with only said one angular position thereof, a pin carried by said plug and interlocked with said body, and resilient means bearing against said plug and said pin.

13. A valve including a body having a threaded passage therethrough, slots opening into said passage and extending longitudinally thereof, and a seat at one end of said passage; and a plug having a non-cylindrical shank threaded on its larger-diameter surfaces to cooperate with the threads of the body, and a seat portion for cooperating with said seat, said shank threads being adapted to lie entirely in the slots in one angular position of the plug whereby said plug may be moved axially when in said angular position, said slots and the corresponding threads of the plug each being non-symmetrical angularly whereby axial movement of the plug is possible with only said one angular position thereof.

14. In a drain valve, a body having a threaded flow passage therethrough, and a seat at the outer end thereof, and a plug having a non-cylindrical shank threaded on its larger-diameter surfaces for cooperation with the threads of said body, said plug having a conical seat adjacent its outer end for engagement with said first-mentioned seat, the major portion of the cross-sectional area of said shank being eliminated from end to end thereof, said passage being at no point of substantially less diameter than the threaded portion thereof, whereby, when the seats are separated, fluid will drain through the passage before striking the plug seat, so that turbulence in the passage is avoided and rate of flow is increased.

15. In combination, a member having a cylindrical threaded drain passage therethrough, said passage being at no point of substantially less diameter than the threaded portion thereof, a seat on said member at the outer extremity of said passage, a plug having a threaded non-cylindrical shank for cooperation with the threads in said passage, a seat portion on said plug adjacent the outer extremity thereof for engagement with said seat to close said passage, said shank being so constructed and arranged that the major portion of the cross-sectional area of said passage from end to end thereof is open to permit flow of associated fluid therethrough when said seat portion is out of engagement with said seat, whereby, when the seat portion on the plug is separated from the seat on the member, fluid will drain through the passage before striking the seat portion, so that turbulence in the passage is avoided and rate of flow is increased.

16. In combination, a member with a cylindrical threaded passage therethrough, a pair of oppositely disposed slots through the threads of said passage and extending longitudinally thereof, one of said slots being wider than the other, and another member having a noncylindrical shank with threaded portions adapted to engage said threads or to slip through said slots, said threaded portions being complementary in width to respective of said slots, and cooperating seats on the respective members.

17. In combination, a member with a cylindrical threaded passage therethrough, a pair of oppositely disposed slots through the threads of said passage extending longitudinally thereof, and another member having a threaded shank with portions of its threads omitted to permit axial movement with respect to said passage through said slots, the threads on said shank and said slots each being angularly nonsymmetrical, whereby said axial movement is permitted in only one angular position of said shank, and cooperating seats on the respective members, the relationship between the threads on said shank and the seat on said second-mentioned member being such that when said seats are in engagement, said shank threads are in the right position to engage the passage threads upon simple turning of the shank.

18. In a drain valve, a member having a threaded flow passage and a seat at one end thereof, a plurality of spaced slots through threads extending longitudinally of said passage, a plug having a noncylindrical shank with threaded portions adapted to engage said passage threads or to slip through said slots, a seat on said plug formed and arranged for line bearing with the first-mentioned seat to close said passage, and means on said plug for actuating the same, said means including a suitable surface which may be tapped with a hammer to reseat the valve when said threaded portions are disposed within said slots.

19. In a drain valve, a member with a threaded opening therethrough, a plug with a noncylindrical shank threaded for cooperation with the threads of said opening, said shank having a substantial portion of its cross-sectional area eliminated from end to end thereof, thereby defining with said member substantially straight fluid flow passages extending longitudinally of said opening at opposite sides of said shank, said opening being at no point of substantially less cross-sectional area than the combined cross-sectional areas of said passages, a seat portion on said plug at the outer end of said shank for cooperation with the outer extremity of said opening to close the same, whereby when said seat portion is in its open position to permit flow of fluid outwardly through said opening, said fluid may pass entirely through said opening before striking said seat portion, and means on the outer end of said plug for actuating the same.

CHARLES E. LAUE.